US006908503B2

United States Patent
McCombs et al.

(10) Patent No.: US 6,908,503 B2
(45) Date of Patent: Jun. 21, 2005

(54) REDUCED NOISE OXYGEN CONCENTRATOR

(75) Inventors: Norman R. McCombs, Tonawanda, NY (US); James A. Alessi, Lockport, NY (US); Rober E. Casey, Buffalo, NY (US)

(73) Assignee: AirSep Corporation, Buffalo, NY (US)

( * ) Notice: Subject to any disclaimer, the term of this patent is extended or adjusted under 35 U.S.C. 154(b) by 8 days.

(21) Appl. No.: 10/421,259

(22) Filed: Apr. 23, 2003

(65) Prior Publication Data

US 2003/0200865 A1 Oct. 30, 2003

Related U.S. Application Data

(60) Provisional application No. 60/375,256, filed on Apr. 24, 2002.

(51) Int. Cl.[7] ............................................. B01D 53/047
(52) U.S. Cl. .............................. 96/130; 96/128; 96/142
(58) Field of Search ............................ 95/96–108, 130, 95/138; 96/108, 114, 115, 121, 126–128, 130–136, 139–142

(56) References Cited

U.S. PATENT DOCUMENTS

| 3,144,314 | A | * | 8/1964 | Jackson | 96/111 |
|---|---|---|---|---|---|
| 3,258,899 | A | * | 7/1966 | Coffin | 96/114 |
| 3,564,816 | A | * | 2/1971 | Batta | 95/100 |
| 3,636,679 | A | * | 1/1972 | Batta | 95/100 |
| 3,717,974 | A | * | 2/1973 | Batta | 95/98 |
| 3,922,149 | A | * | 11/1975 | Ruder et al. | 95/22 |
| 4,302,224 | A | * | 11/1981 | McCombs et al. | 96/109 |
| 4,342,573 | A | * | 8/1982 | McCombs et al. | 96/109 |
| 4,509,959 | A | * | 4/1985 | McCombs | 96/115 |
| 4,559,065 | A | * | 12/1985 | Null et al. | 96/111 |
| 4,584,001 | A | * | 4/1986 | Dechene | 96/114 |
| 4,802,899 | A | * | 2/1989 | Vrana et al. | 96/109 |
| 4,826,510 | A | * | 5/1989 | McCombs | 96/127 |
| 4,971,609 | A | * | 11/1990 | Pawlos | 96/128 |
| 5,171,336 | A | * | 12/1992 | Shulick | 96/115 |
| 5,474,595 | A | * | 12/1995 | McCombs | 95/23 |
| 5,531,807 | A | * | 7/1996 | McCombs | 95/26 |
| 5,871,564 | A | * | 2/1999 | McCombs | 95/98 |
| 6,036,754 | A | * | 3/2000 | Rowe | 96/130 |
| 6,478,850 | B1 | * | 11/2002 | Warren | 95/21 |
| 2002/0029691 | A1 | * | 3/2002 | McCombs et al. | 95/96 |

* cited by examiner

*Primary Examiner*—Robert H. Spitzer
(74) *Attorney, Agent, or Firm*—Hiscock & Barclay, LLP

(57) ABSTRACT

A pressure swing adsorption apparatus for producing a gas mixture with a higher concentration of a particular gas such as oxygen from ambient air, in which the noisier components of the apparatus are contained in an internal removable module that is separated by sound insulation from the balance of the apparatus to attenuate structure borne vibration, reduce radiated noise, and to absorb airborne sound.

4 Claims, 6 Drawing Sheets

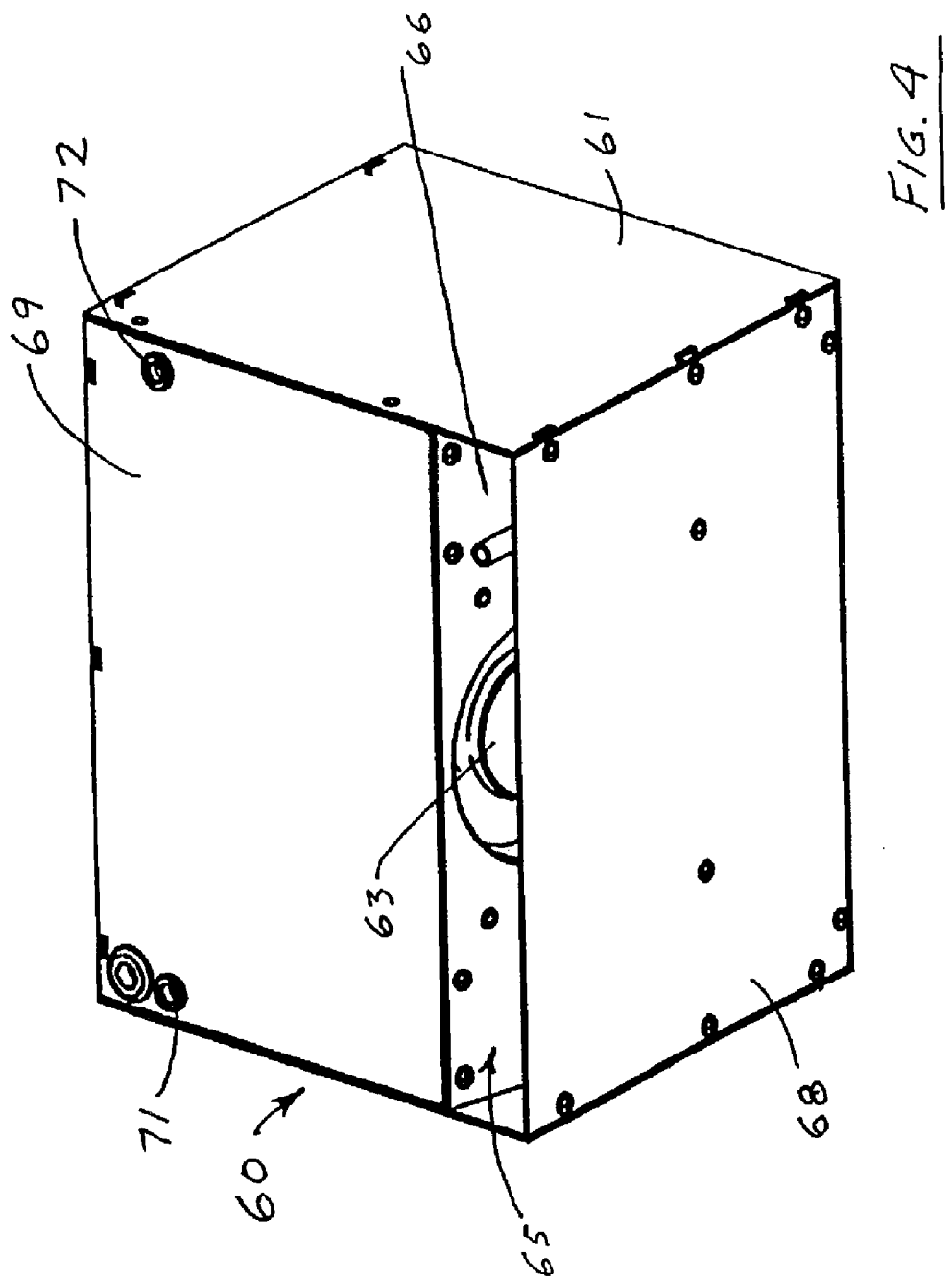

REDUCED NOISE OXYGEN CONCENTRATOR

CROSS REFERENCE TO RELATED APPLICATIONS

This application claims priority from a U.S. Provisional Patent Application, Ser. No. 60/375,256, filed Apr. 24, 2002.

FIELD OF THE INVENTION

The present invention relates generally to an oxygen concentration apparatus, and more particularly to the concentration of oxygen by pressure swing adsorption.

BACKGROUND OF THE INVENTION

Various types of equipment are known to provide patients with oxygen or oxygen-enriched air supplies in order to sustain life-support systems or relieve symptoms of various types of debilitating diseases, particularly of the lungs. In the past, pure oxygen or oxygen-enriched gases supplied from pressurized cylinders have been used. However, such cylinders are cumbersome and have a relatively short life before they need to be refilled or replaced. Oxygen concentrators using the principle of pressure swing adsorption were designed to overcome these obstacles.

Generally, the pressure swing adsorption technique, hereinafter referred to as PSA, is used to concentrate a selected gas out of a mixture of gases. Particularly, the oxygen concentrator is a device used to concentrate oxygen out of ambient air and to supply the oxygen concentrated mixture for medical or other purposes, where an oxygen rich gas is required. The general type and operating principles of PSA apparatus with which this invention is concerned are described in U.S. Pat. Nos. 3,564,816; 3,636,679; 3,717,974; 4,802,899; 5,531,807 and 5,871,564, among others. For example, a pressure swing adsorption apparatus may include one or more adsorbers, each having a fixed sieve bed of adsorbent material to fractionate at least one constituent gas from a gaseous mixture by adsorption into the bed, when the gaseous mixture from a feed stream is sequentially directed through the adsorbers in a co-current direction. While one adsorber performs adsorption, another adsorber is simultaneously purged of its adsorbed constituent gas by part of the product gas that is withdrawn from the first or producing adsorber and directed through the other adsorber in a counter-current direction. Once the other adsorber is purged, the feed stream at a preset time is then directed to the other adsorber in the co-current direction, so that the other adsorber performs adsorption. The first adsorber then is purged either simultaneously, or in another timed sequence if there are more than two adsorbers, all of which will be understood from a reading of the above described patents. While oxygen concentrators have proven to be very useful for many medical and other applications, those known to us will generate a noise level that can limit their usefulness in many environments, such as public locations or at health treatment facilities.

Additionally, the compact size of this device requires internal components to be tightly packed and in close proximity of each other. While the compact size of the device gives the apparatus a distinct advantage, difficulty may be experienced in repair or maintenance. Removal or repair of a particular component often requires the removal of surrounding components so that access may be obtained.

Therefore, what is needed in the art is a compact and mobile oxygen concentrator with reduced noise.

Furthermore, what is needed in the art is an oxygen concentrator with easily accessible components to assist in maintenance and repair.

SUMMARY OF THE INVENTION

The present invention provides a new and improved pressure swing adsorption ("PSA" or "oxygen concentrator") apparatus that can operate at a lower noise level than prior art oxygen concentrators and facilitates access to internal components. This is accomplished by a unique configuration of internal components combined with strategic placement of sound deadening material. The prior art oxygen concentrators as known to us operate, for example, at noise levels of between about 48 and 54 decibels. The oxygen concentrator of the present invention will operate at a significantly lower noise level of about 38 decibels, and even lower. This improvement is accomplished by the strategic placement of noise absorbing material and rearrangement of the physical layout of the major noise-generating components in a removable module within the overall housing or cabinet of the PSA apparatus. The removable module serves as an advantage during maintenance and repair because all major components thus become easily accessible upon removal of the module. Also, from a manufacturing standpoint, the component assembly and receiving cabinet can be standardized, such that multiple models can be furnished to meet customer demand through the substitution of various module assemblies.

The module assembly contains virtually all of the noisier items of a PSA apparatus, including the air flow generating fan, the resonator and compressor used to intake air to be fractionated, the valves controlling the gas flow through the adsorber beds, and the exhaust muffler. The noise reducing qualities of this device are further enhanced by the addition of at least one layer of sound absorbing material positioned between the outer walls of the module and the adjacent walls of the outer housing and internal components not contained within the module. This sound absorbing material will attenuate structure borne vibration, reducing radiated noise, as well as absorb airborne sound.

BRIEF DESCRIPTION OF THE DRAWINGS

The above-mentioned and other features and advantages of this invention, and the manner of attaining them, will become apparent and be more completely understood by reference to the following description of a preferred embodiment of the invention when read in conjunction with the accompanying drawings, wherein:

FIG. 4 is an isometric view of the component module assembly from the front and top, without the noise reducing material.

Corresponding reference characters indicate corresponding parts throughout the several views. Although a preferred embodiment is illustrated and described, it is not to be construed as limiting the scope of the invention in any manner.

DETAILED DESCRIPTION OF INVENTION

Turning now to the drawings and in accordance with the present invention, there is shown a specific embodiment, generally indicated as 20, of a pressure swing adsorption apparatus, used for fractionating at least one component, namely nitrogen, from a gaseous mixture, generally but not necessarily ambient air, by pressure swing adsorption to produce a product gas. Although the invention as described uses two nitrogen adsorbers, it may also be incorporated into PSA apparatus using one or more than two adsorbers.

Figure 1:
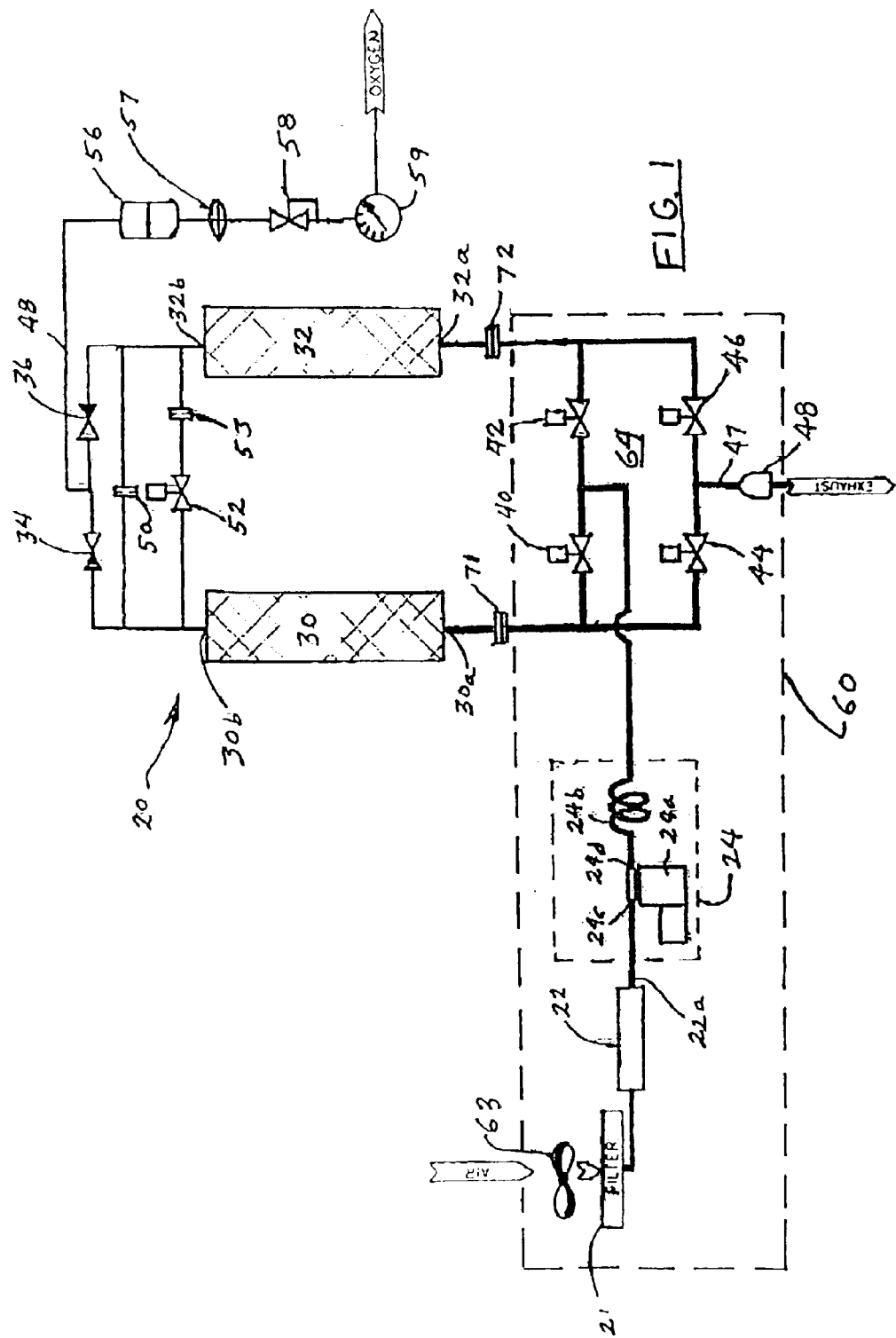
FIG. 1 is a schematic illustration of a combined PSA apparatus according to the invention.

With reference to FIG. 1, ambient air is supplied to the PSA apparatus 20 through a filtered intake 21 and an intake resonator 22 to decrease the noise from the intake of the ambient air feed stream. The feed stream continues from resonator 22 and is moved from its outlet 22a by a feed air compressor/heat exchanger assembly 24 alternatively to first and second adsorbers 30, 32 through feed valves 40 and 42 respectively. Compressor/heat exchanger assembly 24 as shown includes a compressor 24a with an air inlet 24c and an outlet 24d followed by the heat exchanger 24b.

Ambient air is supplied to the apparatus 20 by a fan 63 used to draw air into the interior of the apparatus 20, a portion of which air is drawn into the filtered intake 21 and the majority of which is directed throughout the interior of the apparatus to cool the operating components.

When the feed stream alternatively enters inlets 30a, 32a of adsorbers 30, 32 in a co-current direction, the respective adsorber fractionates the feed stream into the desired concentration of product gas. The adsorbent material used for the beds to separate nitrogen from the ambient air may be a synthetic zeolite or other known adsorber material having equivalent properties.

The substantial or usable portion of the oxygen enriched product gas generated by the ambient air flowing in the co-current direction sequentially in each one of the adsorbers 30, 32 is directed through the outlet 30b, 32b and check valve 34, 36 of the corresponding adsorber to a product manifold 48 from where it is delivered to a mixing tank 56. From mixing tank 56, the product gas is delivered through a bacteria filter 57 to a user outlet at a regulated pressure and flow rate as determined by a flow controller 59 and a pressure regulator 58. The balance of the product gas generated by each adsorber is timed to be diverted through a purge orifice 50 and a properly timed equalization valve 52 and an optional flow restrictor 53 to flow through the other adsorber 30 or 32 in the counter-current direction from the respective outlet 30b, 32b and to the respective inlet 30a, 32a of the other adsorber to purge the adsorbed, primarily nitrogen, gases. The counter-current product gas and purged gases then are discharged to the atmosphere from the adsorbers through properly timed waste valves 44, 46, tubing 47 and a sound absorbing muffler 48.

As the principal noise generating components are the fan 63, intake resonator 22, the compressor/heat exchanger assembly 24, the feed and waste valves 40, 42, 44, 46, and sound absorbing muffler 48, these components according to the invention are mounted in a separate, removable module assembly 60 as will be described.

Figure 2:
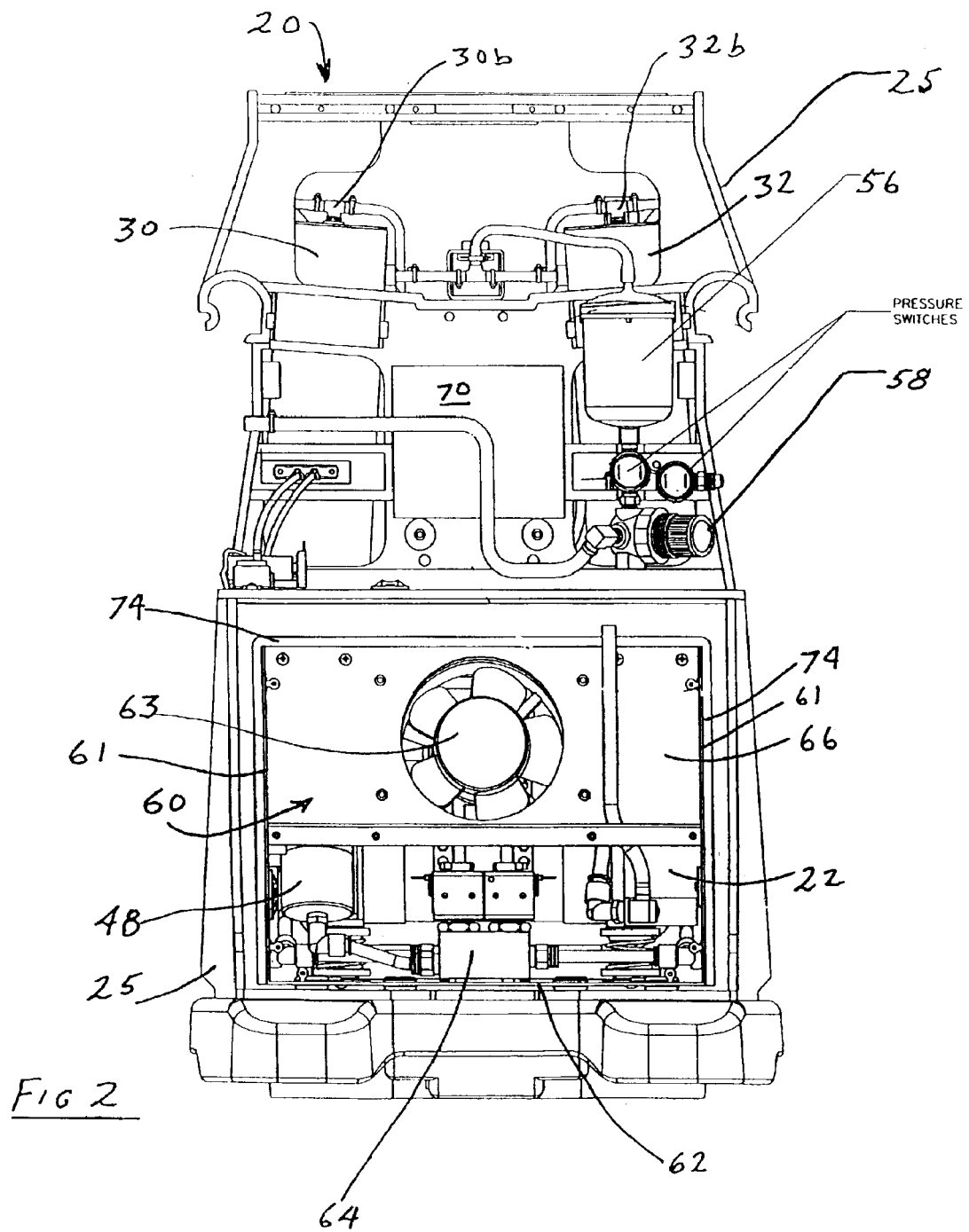
FIG. 2 is a front view of the reduced noise oxygen concentrator with the front panel of the component module assembly removed.

Referring now to FIG. 2, a front view of the reduced noise oxygen concentrator 20 is shown. The operating components of the apparatus are enclosed within an outer housing or cabinet 25, the front cover of which has been removed from this view to illustrate component module assembly 60. Attached to the outer surface of the module side walls 61 at both sides and the top wall 69 is a layer of sound deadening material 74. Also shown in FIG. 2 is a fan assembly panel 66. Additionally, a layer of sound deadening material is shown to be attached to the inner surface of the back wall 67 of the cabinet superstructure (not shown), where the outer surface of the back wall 67 of the module assembly 60 meets the inner surface of the back wall.

Figure 3:
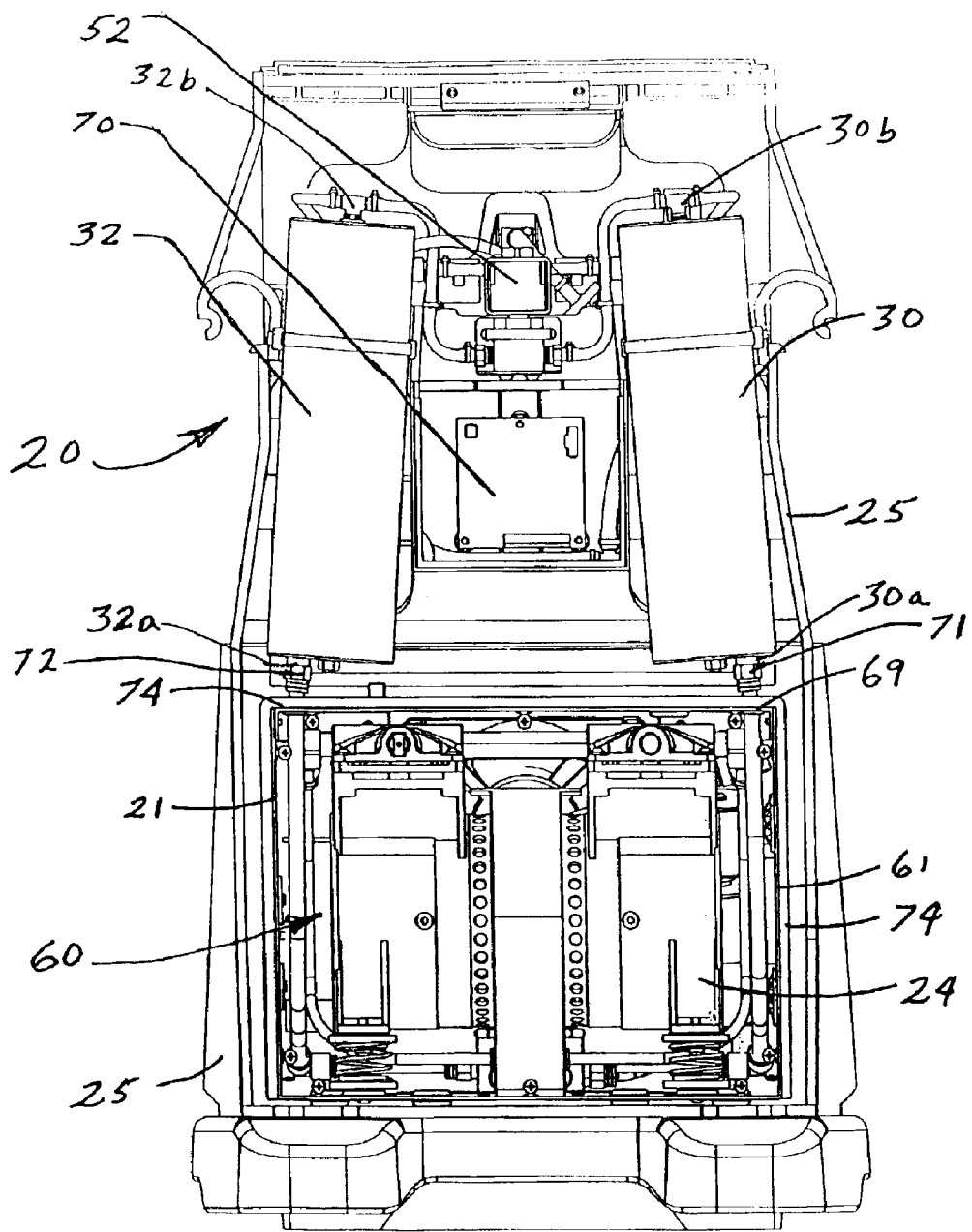
FIG. 3 is a back view of the reduced noise oxygen concentrator with its back cover removed.

Referring again to FIG. 2, the working components shown to be mounted on the front side of the concentrator 20 within module 60 include intake resonator 22, fan 63, a valve block 64 forming the feed and waste valves 40, 42, 44, 46, and waste muffler 48. The working components of the back side of the concentrator as illustrated in FIG. 3 and partially in FIG. 2 include the pair of adsorbers 30 and 32, equalization valve 52, a circuit board 70 containing the electronic components that control the operating sequence of the apparatus 20, and compressor assembly 24. The compressor 24 is mounted to the bottom wall 62 of module 60 by means of the appropriate screws or other suitable fastening devices.

Figure 6:
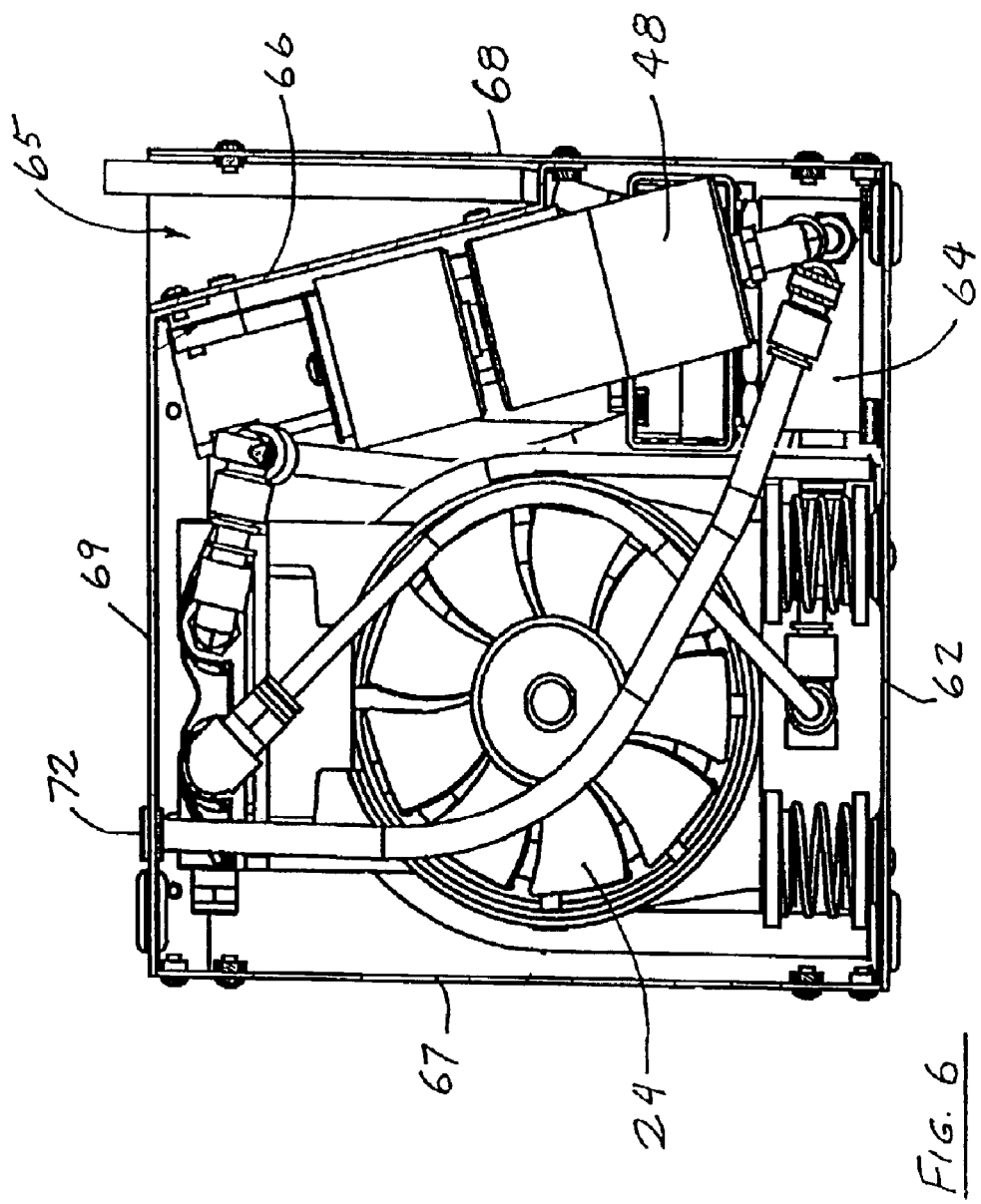
FIG. 6 is a side view of the component module assembly with side cover removed.

The valve block 64, as shown in FIG. 2 and FIG. 6, is disposed within module 60 immediately below and in front of the compressor assembly 24. The valve block 64 may suitably be attached to bottom wall 62 by means of a quick release fastener, such as Velcro™. The feed valves 40, 42 are in the flow path between the heat exchanger 24b and the adsorber inlets 30a, 32a by suitable tubing which at 71 and 72 are connected by detachable couplings to enable removal of the module 60. Although not illustrated, the electrical connections between the operating components within the module 60 on the one hand, and the power source and circuit board 70 on the other hand, also are made by detachable bus connections in a manner well known in the art.

Immediately above the bottom wall 62 of module 60 is the intake resonator 22. The intake resonator 22, as shown in FIG. 5, is mounted in close proximity to fan 63 to receive through filtered intake 21 (not shown) the portion of air to be fractionated. Ambient air is drawn into housing 25 by a suitable louvered opening (not shown) in the rear wall 67 of housing 25.

The upper wall 69 of component module assembly 60 has an opening 65 coinciding with the internal fan panel 66. The fan panel 66 is mounted at about a 20° angle so that fan 63 draws air from inside housing 25 into the component module assembly 60 to be directed partially into intake 21 and the balance over the operating components within module 60 before exiting through an opening at the back wall of module 60.

In furtherance of this objective the fan and compressor have been repositioned within the walls of the module to further reduce the noise level. This is accomplished by positioning the compressor substantially toward the back wall, opposing the fan panel 66.

Figure 5B:
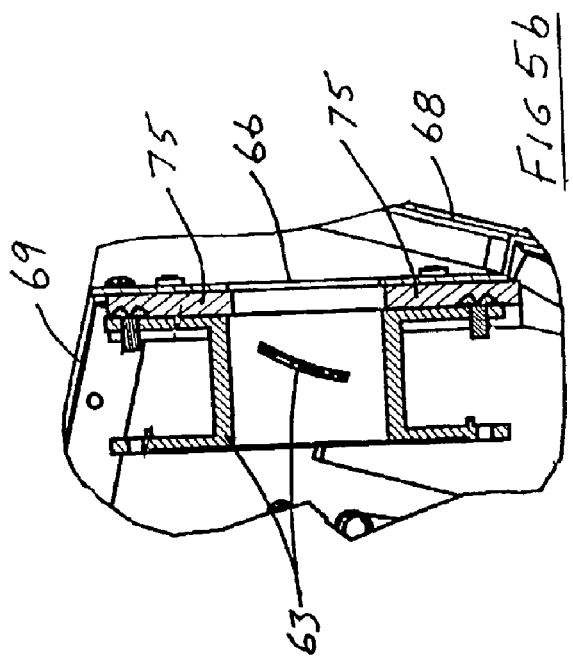
FIG. 5a and FIG. 5b are detailed drawings of the fan mounted to the fan assembly panel.
Figure 5A:
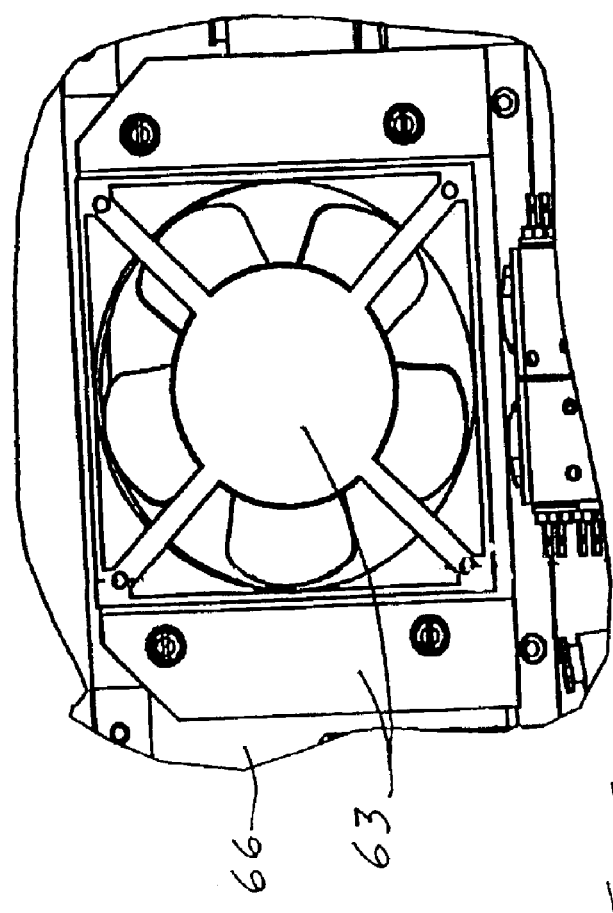

FIG. 4 further illustrates the opening 65 in the top of the module 60 adjacent to the fan 63. FIG. 5a and FIG. 5b provide two views of the fan 63 and fan panel 66 and further illustrate the means and angle by which fan 63 is mounted to the fan panel 66. FIG. 5b further illustrates a layer of sound absorbing material 75 between the fan assembly panel 66 and the fan 63. The fan assembly panel 66 is then mounted between the sidewalls angularly facing the opening in the upper wall. The noise reducing qualities of this device are further enhanced by the addition of a layer of sound absorbing material 75. This sound absorbing material will attenuate structure borne vibration and reduce radiated noise. Suitable openings (not shown) are provided in the modules walls, as for example bottom wall 62 and back wall 67 of the component module assembly 60 where the circulating air cooling the contained components and the waste gas from muffler 48 exit the component module assembly.

FIG. 6 is a side view of the component module assembly with side cover removed. The figure particularly illustrates a compressor 24 mounted in close proximity to the back wall 67 of the component module assembly. The figure also illustrates a side view of the fan panel 66, mounted in close proximity to the front wall 68 of the component module assembly. Sounds normally associated with the discharging of a pressurized stream of gas to the atmosphere are muffled by the silencer 48.

While this invention has been described as having a particular design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. In a pressure swing adsorption apparatus having operating components producing a concentration of oxygen or other gas from a gas mixture such as ambient air, the apparatus having an outer housing enclosing the operating components comprising a blower fan, an intake resonator, a gas compressor, operating valves, means for generating the gas concentration, and an exhaust muffler, the improvement comprising a component module positioned within said housing and having side, top and bottom walls containing and substantially enclosing at least the blower fan, intake resonator, gas compressor and operating valves, the walls defining an opening in fluid communication with the blower fan for drawing the gas mixture into the module and partly into the intake resonator, the walls further defining an opening to exhaust from the module and into the housing the portion of the gas mixture not drawn into the intake resonator, sound and vibration means on the module walls for substantially attenuating sounds and vibrations emanating from the components enclosed in the module, and means for removably mounting the module and enclosed components as a unit within the housing.

2. The improvement according to claim 1 in which the module further encloses the exhaust muffler.

3. The improvement according to claim 1 in which the blower fan is affixed to the one of the walls, and the sound and vibration means comprises vibration absorbing means between the blower fan and the one wall.

4. The improvement according to claim 1 in which the sound and vibration means comprises at least one material layer of sound absorbing material covering a surface of at least each of the side and top walls.

* * * * *